United States Patent
Hirano

(10) Patent No.: US 6,560,064 B1
(45) Date of Patent: May 6, 2003

(54) DISK ARRAY SYSTEM WITH INTERNAL ENVIRONMENTAL CONTROLS

(75) Inventor: Toshiki Hirano, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/533,721

(22) Filed: Mar. 21, 2000

(51) Int. Cl.$^7$ .............................................. G11B 33/14
(52) U.S. Cl. ............................ 360/97.02; 360/98.01; 360/69
(58) Field of Search ........................ 360/69, 97.02, 360/97.03, 98.01, 98.07, 99.04; 369/76, 77.2; 318/476; 361/690, 691, 694, 685, 695; 174/16.1, 17 SF, 17 VA, 50.51; 312/223.1

(56) References Cited

U.S. PATENT DOCUMENTS

| | | | | |
|---|---|---|---|---|
| 3,731,291 A | * | 5/1973 | Walsh ...................... 360/97.03 |
| 3,831,845 A | * | 8/1974 | Pacht .......................... 239/76 |
| 4,051,892 A | * | 10/1977 | Reinsch ................ 165/104.14 |
| 4,164,768 A | * | 8/1979 | Janssen et al. ........... 360/98.03 |
| 4,367,503 A | | 1/1983 | Treseder ..................... 360/98 |
| 4,380,158 A | * | 4/1983 | Bous ...................... 68/205 R |
| 4,595,343 A | * | 6/1986 | Thompson et al. ........... 417/53 |
| 4,720,981 A | * | 1/1988 | Helt et al. ................ 165/80.4 |
| 5,422,766 A | * | 6/1995 | Hack et al. .............. 360/97.02 |
| 5,465,184 A | * | 11/1995 | Pickering et al. ........... 360/126 |
| 5,729,399 A | * | 3/1998 | Albrecht et al. .............. 360/75 |
| 5,814,131 A | * | 9/1998 | Lemcoff et al. ............... 95/96 |
| 5,823,005 A | * | 10/1998 | Alexander et al. .......... 361/691 |
| 5,841,607 A | * | 11/1998 | Khan et al. .............. 360/99.08 |
| 5,844,777 A | * | 12/1998 | Gates ....................... 165/185 |
| 5,852,795 A | * | 12/1998 | Neumann et al. ............. 700/10 |
| 5,912,799 A | * | 6/1999 | Grouell et al. ........... 312/223.2 |
| 5,936,499 A | * | 8/1999 | Eckels ....................... 335/216 |
| 5,997,614 A | * | 12/1999 | Tuma et al. ............. 360/97.02 |
| 6,022,007 A | * | 2/2000 | Schaldach .................... 269/25 |
| 6,144,178 A | * | 11/2000 | Hirano et al. .............. 318/476 |
| 6,149,161 A | * | 11/2000 | Grantz et al. .............. 277/427 |
| 6,175,547 B1 | * | 1/2001 | Kogure ...................... 369/269 |
| 6,105,737 A1 | * | 8/2001 | Weigert et al. ............. 188/158 |
| 6,317,286 B1 | * | 11/2001 | Murphy et al. .......... 360/97.02 |
| 6,320,744 B1 | * | 11/2001 | Sullivan et al. .......... 312/223.2 |
| 6,330,153 B1 | * | 12/2001 | Ketonen et al. ....... 165/104.33 |
| 6,353,210 B1 | * | 3/2002 | Norrbakhsh et al. ... 219/121.43 |

FOREIGN PATENT DOCUMENTS

| | | | |
|---|---|---|---|
| JP | 7021752 A | 1/1995 | |
| JP | 8077527 A | 3/1996 | ................... 5/455 |
| JP | 10222960 | 8/1998 | ..................... 25/4 |

OTHER PUBLICATIONS

IBM Technical Disclosure, *Disk File with Reduced or Eliminated Air Effects*, vol. 23, No. 9 Feb. 1981, pp. 4310–4311.

* cited by examiner

*Primary Examiner*—Brian E. Miller
*Assistant Examiner*—Dzung C. Nguyen
(74) *Attorney, Agent, or Firm*—Lumen Intellectual Property Services, Inc.

(57) ABSTRACT

A disk drive array system using a vacuum pump to reduce the disk drive internal pressures and/or a helium circulator to fill and circulate helium in a disk drive array to reduce vibrations, reduce power consumption, and increase cooling (when helium is used). The disk drive array system is also configured such that individual disk drives can be removed from the disk drive array without affecting the internal pressures of the remaining disk drives in the array.

39 Claims, 3 Drawing Sheets

DISK ARRAY SYSTEM WITH INTERNAL ENVIRONMENTAL CONTROLS

FIELD OF THE INVENTION

The present invention relates to magnetic hard disk drives and more particularly to vibration and power consumption minimization in disk drive array systems.

DESCRIPTION OF THE RELATED ART

Disk drives, also called disk files, are information storage devices that use a rotatable rigid disk with concentric data tracks containing the information, a head or transducer for reading and/or writing data onto the various tracks, and an actuator connected to a carrier for the head for moving the head to the desired track and maintaining it over the track centerline during read and write operations. The most common form of actuator is a rotary voice coil motor (VCM) actuator that moves the head carrier in a nonlinear, generally arcuate path across the disk. There are typically a number of disks mounted on a hub that is rotated by a disk drive motor, also called a spindle motor, and a number of head carriers connected to the actuator for accessing the surfaces of the disks. A housing supports the drive motor and head actuator and surrounds the heads and disks to provide a substantially sealed environment. In conventional magnetic recording disk drives, the head carrier is an air-bearing slider that has an air-bearing surface (ABS) designed to enable the slider to "fly" or ride on a bearing of air above the disk surface when the disk is rotating at its operating speed. The slider is maintained next to the disk surface by a biasing force from a suspension that connects the slider to the actuator. The suspension is attached to a rigid arm connected to the actuator.

Contact start/stop (CSS) disk drives operate with the slider in contact with the disk surface during start and stop operations when there is insufficient disk rotational speed to maintain the air bearing. To minimize the effect of "stiction", i.e. the static friction and adhesion forces between the very smooth disk surface and the slider, CSS disk drives often use a dedicated "landing zone" where the slider is parked when the drive is not operating. The landing zone is typically a specially textured non-data region of the disk. In contrast to CSS disk drives, "load/unload" disk drives address the stiction problem by mechanically unloading the slider from the disk when the power is turned off, and then loading the slider back onto the disk when the disk has reached a speed sufficient to generate the air bearing. The loading/unloading is typically done by means of a ramp that contacts the suspension when the actuator is moved away from the data region of the disk. The slider is thus parked off the disk surface with the suspension supported in a recess of the ramp. Load/unload disk drives are more commonly used in a laptop and notebook computers because the parking of the slider on the ramp away from the disk surface also provides some resistance to external shocks caused by moving or dropping the computer.

To improve the performance of disk drives, particularly the rate at which the recorded data can be accessed, it is desirable to rotate the disks at high RPM. In addition, it is desirable to place the data tracks as close together as possible to maximize the data storage capacity. However, when conventional disk drives, such as commercially available 3.5 inch and 2.5 inch form factor drives, are rotated at high RPM they consume excessive power and generate excessive heat in the disk drive housing. In addition, high speed disk rotation causes airflow-induced disk "flutter" and vibration of the suspension and/or arm, which makes it difficult for the read/write head to locate the proper data track. This is referred to as track misregistration (TMR).

While individual disk drives are typically used in personal computers, disk drive array systems are used with mainframe computers because mainframe computers require a very large amount of disk storage capacity. Disk drive array systems are typically 200 or more individual disk drives connected and housed together to provide a large storage capacity. Since there are so many disk drives operating at once in a confined housing space, vibration, power consumption, and heat dissipation becomes even more of a concern.

The use of a hermetically sealed disk drive housing containing a gas other than air, such as helium, to reduce the effect of heat generation within the housing has been proposed, as described in U.S. Pat. No. 4,367,503 and Japanese published patent application JP8077527A. IBM Technical Disclosure Bulletin, Vol. 23, No.9 (February 1981), pp. 4310–4311, describes a removable disk pack mounted on a drive apparatus that uses reduced air pressure around the rotating disks to reduce the effects of heat generation and air turbulence. Japanese published patent application JP7021752A describes a test apparatus that uses a vacuum pump to remove air from within the test chamber for the purpose of testing the head carrier-disk interface. Japanese published patent application JP10222960A describes an optical CD-ROM drive with a vacuum pump for removing air to decrease air resistance and eliminate dust particles.

A need therefore exists for providing a disk drive array system where the disk drives within can operate at high disk RPM without consuming excessive power and without generating disk flutter or vibration of the suspension arm.

SUMMARY OF THE INVENTION

A principle objective of the present invention is to provide a disk drive array system wherein the disk drives consumes less power and causes less vibration when run in high RPM.

In view of the forgoing objectives, an embodiment of the present invention provides a disk drive array system that utilizes a vacuum pump to reduce the internal pressure of the disk drives during operation. The vacuum pump is control by a pump controller that receives a pressure indicating signal from a pressure sensor. The pump controller maintains the disk drive internal pressure to a predefined reduced pressure, 0.5–0.6 atm for example. Because of this reduced internal pressure, disk drives with an ABS designed to operate at such reduced pressures have to be used.

In another embodiment of the present invention, helium is circulated in the disk drives in a disk drive array system. Helium provides the same benefits of reducing vibrations and power consumption, but also the added benefit of better thermal conductivity compared to air and thus has better cooling.

A third embodiment of the present invention involves the use of a vacuum pump to achieve a reduced internal pressure and also a helium circulator to circulate helium in the disk drives in a disk drive array system. This embodiment combines the benefits of the reduced internal pressure environment as well as the better thermal conductivity of a helium environment.

In all the embodiments, the disk drive array system must be configured such that removing an individual disk drive will not affect the internal pressures of the remaining disk drives.

BRIEF DESCRIPTION OF THE DRAWINGS

The foregoing and other objects, features and advantages of the present invention will be apparent from the following detailed description of the preferred embodiments of the invention, reference being made to the accompanying drawing, in which like reference numerals indicate like parts and in which.

DETAILED DESCRIPTION OF THE EMBODIMENTS

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
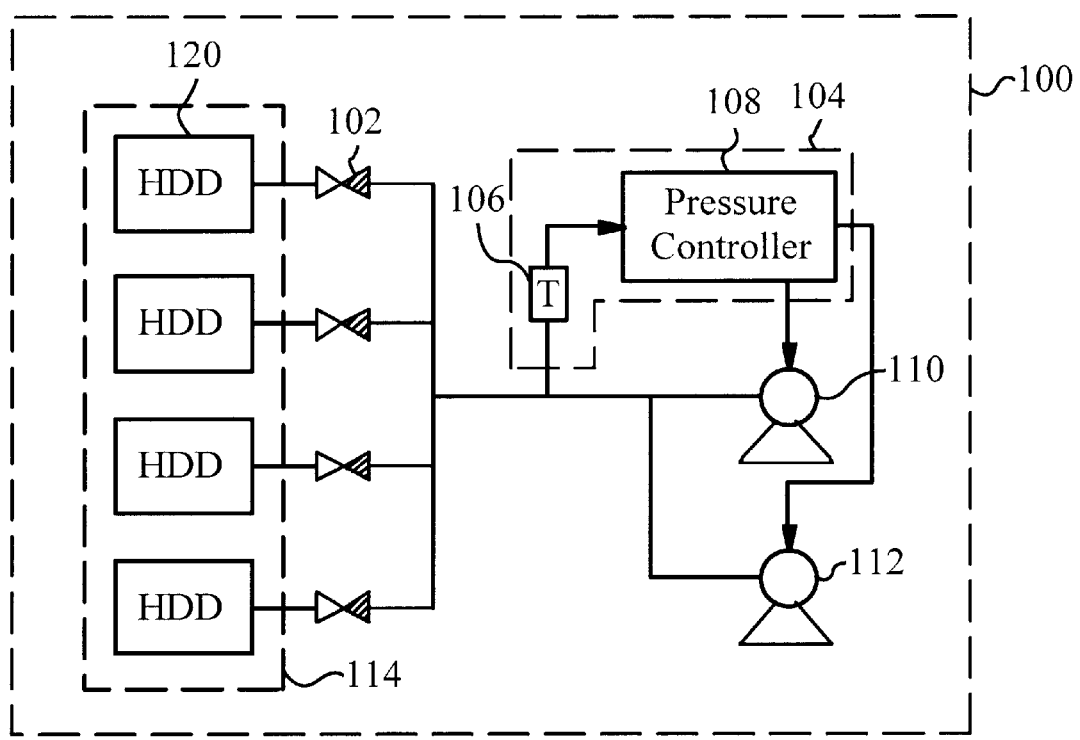
FIG. 1 is a schematic diagram of a disk drive array system according to an embodiment of the present invention.

FIG. 1 shows an embodiment of the present invention. A disk drive array 114 is coupled with a pump 110 and a pump controller system 104 to form the disk drive array system 100. The disk drive array 114 is pumped down to a predefined reduced internal pressure, 0.5–0.6 atm for example, using the pressure pump 110. Each disk drive 120 is connected to the pressure pump individually, via a quick connector 102. When disconnected, the quick connector 102 shuts off on both sides, i.e. each half of the connector shuts off. This allows individual disk drives 120 to be disconnected from the disk drive array 114 without affecting the pressures in the remaining disk drives. Because of the reduced internal pressure, disk drives 120 with an ABS designed to operate at the predefined reduced pressure have to be used.

During start up operations when the disk drive array's pressure is the highest, the pressure pump 110 must be sufficiently large to pump the disk drive array system 114 down to the predefined pressure in 1 minute or less.

The pressure pump 110 is controlled by a pressure controller system 104. This pressure controller system 104 can consist of an electrical circuit system that receives a digital or analog pressure indicating signal from a pressure sensing device 106 such as a pressure transducer. Using this pressure indicating signal, the pressure controller system turns the pressure pump on or off.

A backup pressure pump 112 can be incorporated into the system configured in the same way as the main pressure pump described above to provide redundancy in mission critical disk drive array system applications.

Alternatively, the pressure controller system 104 can be a pressure regulator used to maintain the pressure in the disk drives at a predefined pressure.

Figure 2:
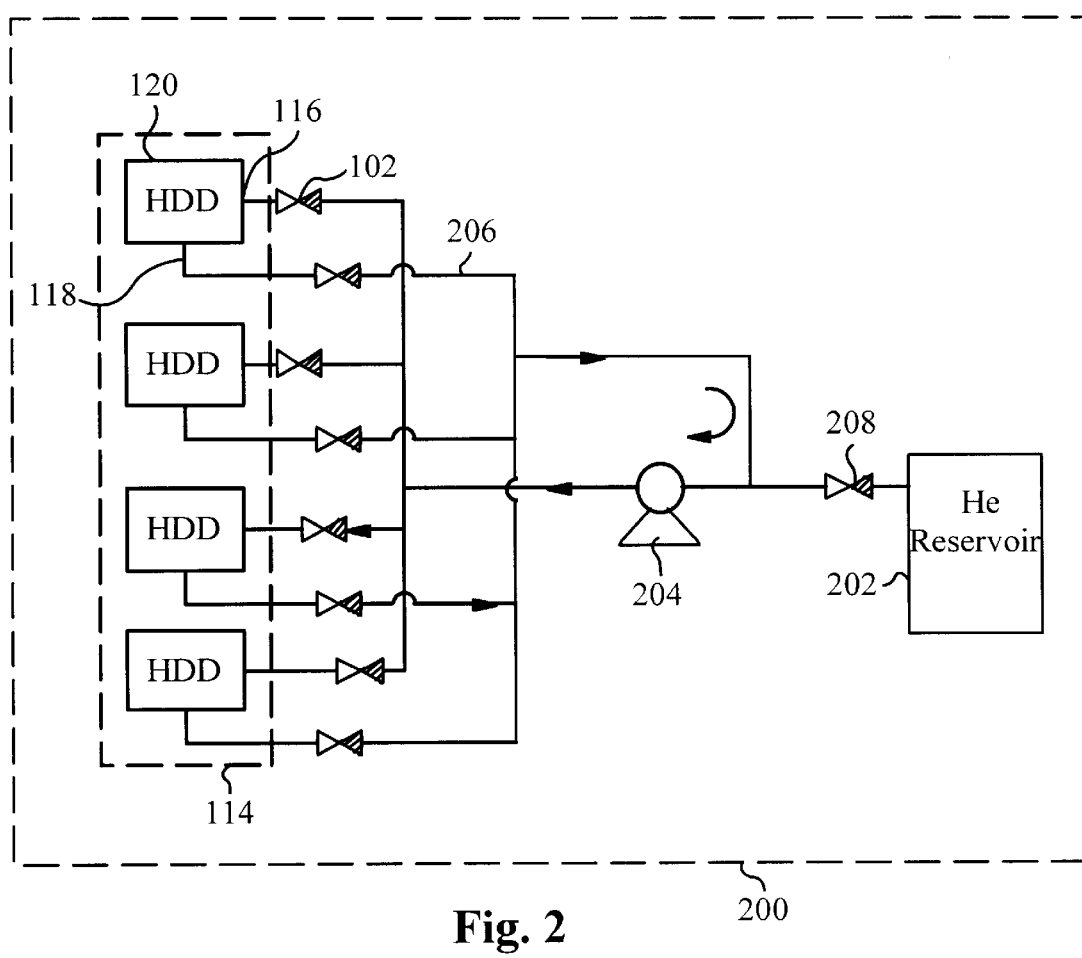
FIG. 2 is a schematic diagram of a disk drive array system according to an alternative embodiment of the present invention.

FIG. 2 shows a disk drive array system 200 configured with a helium circulator system 206 and a helium reservoir tank 202. Using helium in place of air reduces the vibration and power consumption. Helium also has better thermal cooling properties than air, and thus will provide better cooling.

Each disk drive 120 has an inflow port 116 and an outflow port 118. The inflow port allows the helium from the circulator 204 to flow into the disk drive 120. The outflow port re-circulates the helium back into the circulator 204. Both the inflow port 116 and the outflow port 118 connects to the inflow line and the outflow line, respectively, via a quick connector 102. This quick connector allows individual disk drives 120 to be removed from the disk drive array 114 without affecting the pressure of the remaining disk drives. Because helium is used instead of air in the disk drives 120, disk drives with an ABS designed to operate in a helium environment have to be used.

Initially, the disk drives are filled with helium from the helium reservoir 202. After the initial filling of helium, the helium reservoir valve 208 is closed. The helium is circulated in the disk drives until there is a need to refill the helium. The helium reservoir valve 208 is opened and helium is refilled into the circulator system 206.

Figure 3:
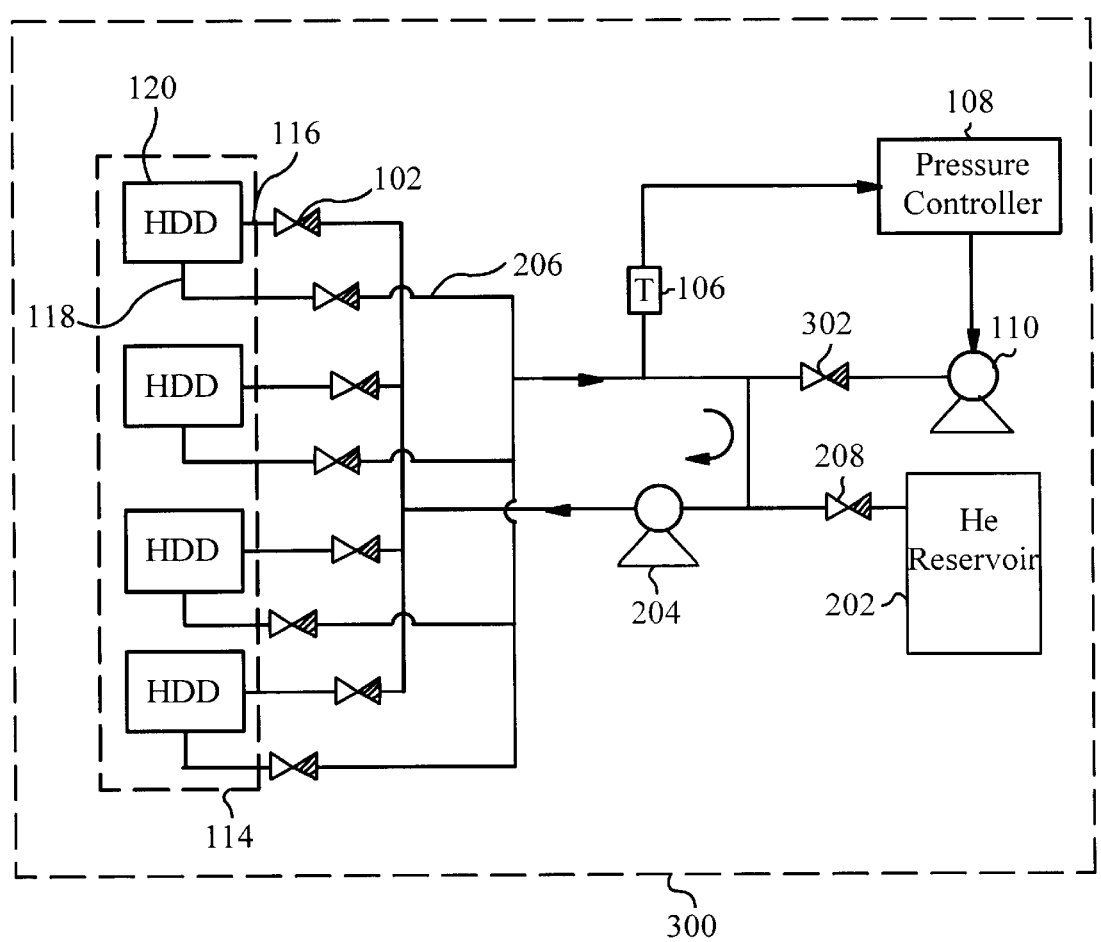
FIG. 3 is a schematic diagram of a disk drive array system according to a third embodiment of the present embodiment.

FIG. 3 shows a disk drive array system 300 that combines a reduced internal pressure environment and a helium circulation system. A disk drive array 114 is pumped down with a pressure pump 110 and at the same time helium is used to fill the disk drive array system.

Each disk drive has an inflow port 116 and an outflow port 118. The inflow port allows the helium from the circulator 204 to flow into the disk drives 120. The outflow port re-circulates the helium back into the circulator 204. Both the inflow port and the outflow port connects to the inflow line and the outflow line, respectively, via a quick connector 102. The quick connector allows individual disk drives 120 to be removed from the disk drive array 114 without affecting the pressure of the remaining disk drives. Suitable quick connectors include the G-063060-XX series quick disconnect valved fittings made by Cole-Parmer Instrument Company (Niles, Ill.) and the 15-340-XX series Fisherbrand All-Metal Quick-Disconnects made by Fisher Scientific (Hampton, N.H.). Because of the reduced internal pressure and helium environment, disk drives 120 with an ABS designed to operate in a helium environment at the predefined reduced pressure have to be used.

Initially, the disk drives 120 are filled with helium from the helium reservoir 202. The helium reservoir valve 208 is closed after the disk drive array 114 is filled with helium. The pressure pump 110 is turned on to pump the disk drive array 114 down to a predefined reduced pressure, 0.5–0.6 atm for example. When the disk drive array 114 reaches the predefined reduced pressure, the pressure pump 110 is switched off and isolated from the circulator system 206 by using a pressure pump isolation valve 302. The helium is circulated by the circulator 204 in the disk drives 120 until there is a need to refill the helium. The helium reservoir valve 208 is opened and helium refills the circulator system 206. The pressure pump 110 is turned on to pump the disk drive array 114 down and is shut off when the predefined reduced pressure is reached. The circulation process continues.

It will be clear to one skilled in the art that the above embodiment may be altered in many ways without departing from the scope of the invention. Accordingly, the scope of the invention should be determined by the following claims and their legal equivalents.

What is claimed is:

1. A disk drive array system comprising:
    a disk drive array comprising two or more substantially sealed disk drives;
    a vacuum pump; and
    quick connectors, each quick connector comprising two halves, wherein the two halves shut off when disconnected; wherein the vacuum pump is connected to each of the disk drives via one of the quick connectors and the vacuum pump reduces the pressure in the disk drives to a predefined reduced pressure, and wherein one of the disk drives is removable from the disk drive array by disconnecting one of the quick connectors without affecting the pressure in the remaining disk drives.

2. The disk drive array system as claimed in claim 1 wherein a pump pressure controller is coupled to the pump.

3. The disk drive array system as claimed in claim 2 wherein the pump pressure controller is a pressure sensor signal based electrical circuit controller.

4. The disk drive array system as claimed in claim 3 wherein the pressure sensor signal is generated by a pressure sensor selected from the group consisting of a pressure transducer, an indicating pressure switch, and an indicating pressure transducer.

5. The disk drive array system as claimed in claim 4 wherein the pressure sensor is coupled to the pressure line between the disk drives and the pressure pump.

6. The disk drive array system as claimed in claim 2 wherein the pump pressure controller is a pressure regulator.

7. The disk drive array system as claimed in claim 1 wherein the pump is sufficiently large to reduce the pressure in the disk drives to the predefined reduced pressure in one minute or less.

8. The disk drive array system as claimed in claim 1 wherein a back up pump is fluidly coupled to each of the two or more disk drives.

9. The disk drive array system as claimed in claim 1 wherein the disk drives are configured to operate at the predefined reduced pressure.

10. A disk drive array system comprising:
two or more substantially sealed disk drives; and
a helium circulator with reservoir, fluidly coupled to each of the two or more disk drives, wherein each disk drive is individually removable from the disk drive array system without affecting the helium in the remaining disk drives.

11. The disk drive array system as claimed in claim 10 wherein each disk drive have an inflow port and an outflow port.

12. The disk drive array system as claimed in claim 11 wherein the inflow port allows helium from the helium circulator to flow into the disk drive.

13. The disk drive array system as claimed in claim 11 wherein the outflow port re-circulates the helium back to the helium circulator.

14. The disk drive array system as claimed in claim 10 wherein the two or more disk drives forms a disk drive array.

15. The disk drive array system as claimed in claim 10 wherein the disk drives are configured to operated in a helium environment.

16. The disk drive array system as claimed in claim 10 wherein a quick connector is connected between an inflow port and an inflow line so that one or more disk drives are removable from the disk array system without affecting the helium in the remaining disk drives.

17. The disk drive array system as claimed in claim 10 wherein a quick connector is connected between an outflow port and an outflow line so that one or more disk drives are removable from the disk array system without affecting the helium in the remaining disk drives.

18. A disk drive array system comprising:
two or more substantially sealed disk drives;
at least one pump, fluidly coupled to each of the two or more disk drives; and
a helium circulator with reservoir, fluidly coupled to each of the two or more disk drives.

19. The disk drive array system as claimed in claim 18 wherein a pump pressure controller is coupled to the pump.

20. The disk drive array system as claimed in claim 19 wherein the pressure controller is a pressure sensor signal based electrical circuit controller.

21. The disk drive array system as claimed in claim 20 wherein the pressure sensor signal is generated by a pressure sensor selected from the group consisting of a pressure transducer, an indicating pressure switch, and an indicating pressure transducer.

22. The disk drive array system as claimed in claim 21 wherein the pressure sensor is coupled to a pressure line between the disk drives and the pressure pump.

23. The disk drive array system as claimed in claim 18 wherein a back up pump is fluidly coupled to each of the two or more disk drives.

24. The disk drive array system as claimed in claim 18 wherein the two or more disk drives forms a disk drive array.

25. The disk drive array system as claimed in claim 18 wherein the disk drives are configured to operated in a helium environment at a predefined reduced pressure.

26. The disk drive array system as claimed in claim 18 wherein each disk drive includes an inflow port and an outflow port.

27. The disk drive array system as claimed in claim 26 wherein the inflow port allows helium from the helium circulator to flow into the disk drive.

28. The disk drive array system as claimed in claim 26 wherein the outflow port re-circulates the helium back to the helium circulator.

29. The disk drive array system as claimed in claim 18 wherein one or more disk drives are removable from the disk drive array without affecting the pressure and helium in the remaining disk drives.

30. The disk drive array system as claimed in claim 29 wherein a quick connector is connected between the inflow port and the inflow line so that one or more disk drives are removable from the disk array without affecting the pressure and helium of the remaining disk drives.

31. The disk drive array system as claimed in claim 29 wherein a quick connector is connected between the outflow port and the outflow line so that one or more disk drives are removable from the disk array without affecting the pressure and helium of the remaining disk drives.

32. A disk drive array system comprising:
a disk drive array having at least two substantially sealed disk drives; and
a pressure controlling means operatively coupled to each of said disk drives, wherein during operation said pressure controlling means reduces internal pressure of said disk drives to a predefined reduced pressure.

33. The disk drive array system according to claim 32, wherein
said pressure controlling means regulates said internal pressure in response to a pressure sensor signal generated by a pressure sensor coupled to a pressure line between said disk drives and said pressure controlling means.

34. The disk drive array system according to claim 33, wherein
said pressure sensor is a pressure transducer, an indicating pressure switch, or an indicating pressure transducer.

35. The disk drive array system according to claim 32, wherein
   said pressure controlling means is capable of reducing said internal pressure to said predefined reduced pressure in one minute or less.

36. The disk drive array system according to claim 32, wherein
   said pressure controlling means comprises at least two pumps and wherein said at least two pumps are respectively coupled to each of said disk drives.

37. The disk drive array system according to claim 32, wherein
   said disk drives are configured to operate at said predefined reduced pressure.

38. The disk drive array system according to claim 32, wherein one or more disk drives being removable from said disk drive array without affecting internal pressure of remaining disk drives.

39. The disk drive array system according to claim 32, further comprising:
   quick connectors wherein each of said quick connectors operatively connects said disk drives and said pressure controlling means and wherein each of said quick connectors comprises two halves that shut off when disconnected thereby enabling one or more disk drives be removed from said disk array without affecting internal pressure of remaining disk drives.

* * * * *